United States Patent
Jääskeläinen

(10) Patent No.: US 9,752,425 B2
(45) Date of Patent: *Sep. 5, 2017

(54) CARRIER ROD FOR AN OPTICAL FIBER ASSEMBLY AND SYSTEM FOR MONITORING DEFORMATION OF WELL EQUIPMENT

(71) Applicant: SHELL OIL COMPANY, Houston, TX (US)

(72) Inventor: Kari-Mikko Jääskeläinen, Katy, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/265,554

(22) Filed: Sep. 14, 2016

(65) Prior Publication Data
US 2017/0002645 A1    Jan. 5, 2017

Related U.S. Application Data

(60) Division of application No. 14/717,401, filed on May 20, 2015, now Pat. No. 9,470,083, which is a (Continued)

(51) Int. Cl.
| E21B 47/01 | (2012.01) |
| G01V 8/16 | (2006.01) |
| E21B 17/02 | (2006.01) |
| E21B 43/10 | (2006.01) |
| E21B 47/00 | (2012.01) |
| E21B 47/12 | (2012.01) |
| E21B 43/24 | (2006.01) |
| E21B 47/06 | (2012.01) |
| E21B 43/08 | (2006.01) |

(52) U.S. Cl.
CPC .......... *E21B 47/011* (2013.01); *E21B 17/026* (2013.01); *E21B 43/08* (2013.01); *E21B 43/10* (2013.01); *E21B 43/24* (2013.01); *E21B 43/2401* (2013.01); *E21B 47/0006* (2013.01); *E21B 47/01* (2013.01); *E21B 47/065* (2013.01); *E21B 47/123* (2013.01); *G01V 8/16* (2013.01)

(58) Field of Classification Search
CPC .... E21B 47/01; E21B 47/0006; E21B 47/065; E21B 47/123; E21B 17/026
USPC .......... 166/250.01, 385, 206, 242.2
See application file for complete search history.

(56) References Cited

U.S. PATENT DOCUMENTS

| 6,268,911 B1 | 7/2001 | Tubel et al. |
| 6,281,489 B1 | 8/2001 | Tubel et al. |

(Continued)

FOREIGN PATENT DOCUMENTS

| GB | 2364380 | 1/2002 |
| WO | 2009158630 | 12/2009 |

(Continued)

*Primary Examiner* — George Gray

(57) ABSTRACT

A carrier rod having at least one recess extending along at least part of the length of the rod, in which recess a optical fiber assembly for monitoring strain, temperature and/or other physical parameters is arranged, which optical fiber assembly is along at least part of its length bonded within the recess. The carrier rod can be used in a system or a method of monitoring deformation and other characteristics of a casing or other tubular or cylindrical well equipment in a well traversing an underground formation.

20 Claims, 3 Drawing Sheets

Related U.S. Application Data continuation of application No. 13/142,451, filed as application No. PCT/EP2009/067866 on Dec. 23, 2009, now abandoned.

(60) Provisional application No. 61/141,738, filed on Dec. 31, 2008.

(56) References Cited

U.S. PATENT DOCUMENTS

| | | |
|---|---|---|
| 6,588,266 B2 | 7/2003 | Tubel et al. |
| 6,787,758 B2 | 9/2004 | Tubel et al. |
| 7,040,390 B2 | 5/2006 | Tubel et al. |
| 7,201,221 B2 | 4/2007 | Tubel et al. |
| 7,284,903 B2 | 10/2007 | Hartog |
| 7,668,411 B2 | 2/2010 | Davies et al. |
| 7,740,064 B2 | 6/2010 | McCoy et al. |
| 7,946,341 B2 | 5/2011 | Hartog et al. |
| 7,954,560 B2 | 6/2011 | Mathiszik et al. |
| 2002/0007948 A1 | 1/2002 | Bayne et al. |
| 2003/0056947 A1 | 3/2003 | Cameron |
| 2003/0056948 A1 | 3/2003 | Cameron |
| 2003/0192706 A1 | 10/2003 | Uhlenkott |
| 2004/0043501 A1 | 3/2004 | Means et al. |
| 2008/0308281 A1 | 12/2008 | Boutwell, Jr. et al. |
| 2009/0188665 A1 | 7/2009 | Tubel et al. |
| 2010/0107754 A1 | 5/2010 | Hartog et al. |
| 2010/0207019 A1 | 8/2010 | Hartog et al. |
| 2010/0315630 A1 | 12/2010 | Ramos et al. |
| 2011/0044574 A1 | 2/2011 | Strong |
| 2011/0069302 A1 | 3/2011 | Hill et al. |
| 2011/0088462 A1 | 4/2011 | Samson et al. |
| 2011/0088910 A1 | 4/2011 | McCann et al. |
| 2011/0149688 A1 | 6/2011 | Hill et al. |
| 2011/0185815 A1 | 8/2011 | McCann |
| 2011/0216996 A1 | 9/2011 | Rogers |
| 2011/0280103 A1 | 11/2011 | Bostick, III |
| 2011/0292763 A1 | 12/2011 | Coates et al. |
| 2012/0017687 A1 | 1/2012 | Davis et al. |
| 2012/0018149 A1 | 1/2012 | Fidan et al. |

FOREIGN PATENT DOCUMENTS

| | | |
|---|---|---|
| WO | 2010010318 | 1/2010 |
| WO | 2010034986 | 4/2010 |
| WO | 2010136764 | 12/2010 |
| WO | 2010136810 | 12/2010 |
| WO | 2011010110 | 1/2011 |
| WO | 2011039501 | 4/2011 |
| WO | 2011058312 | 5/2011 |
| WO | 2011058313 | 5/2011 |
| WO | 2011058314 | 5/2011 |
| WO | 2011058322 | 5/2011 |
| WO | 2011067554 | 6/2011 |
| WO | 2011076850 | 6/2011 |
| WO | 2011079107 | 6/2011 |
| WO | 2011141537 | 11/2011 |
| WO | 2011148128 | 12/2011 |

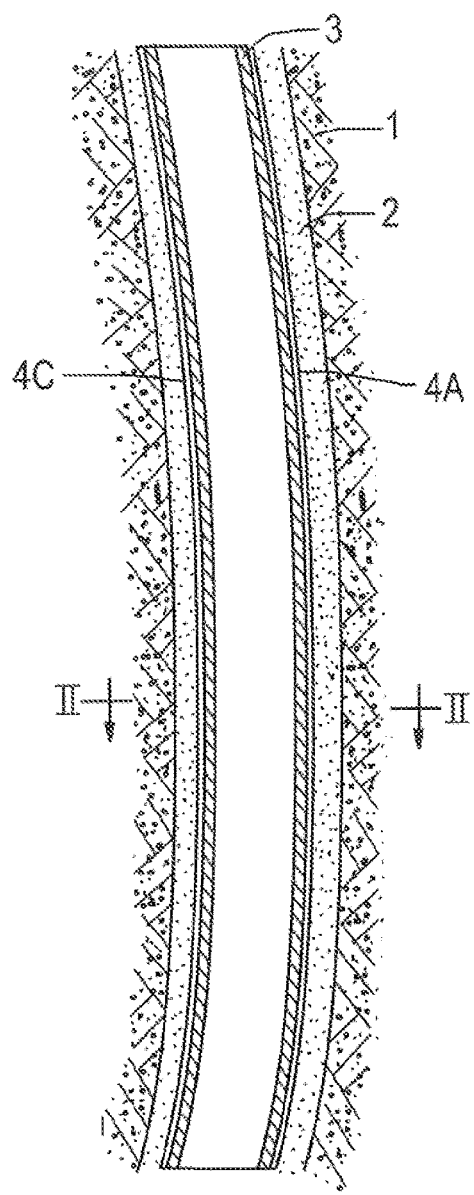
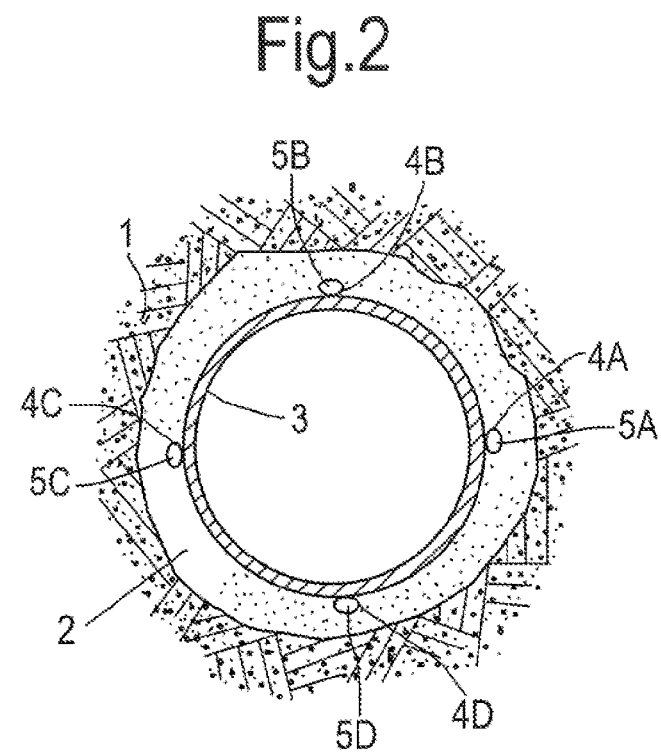

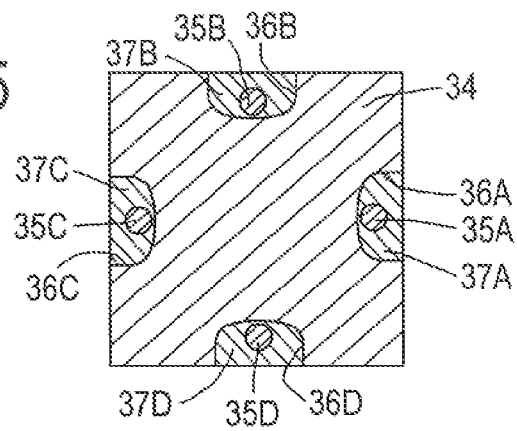
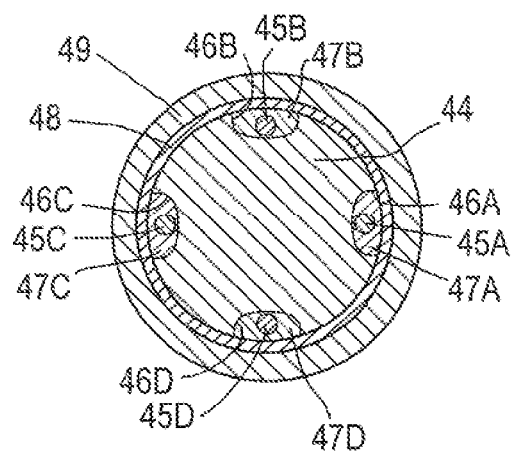
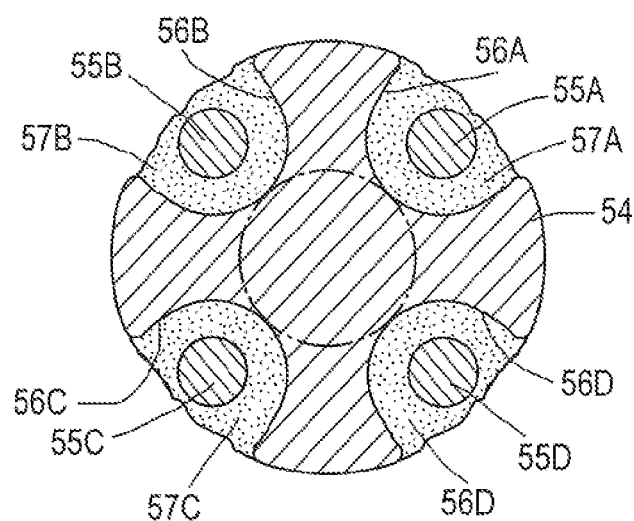

CARRIER ROD FOR AN OPTICAL FIBER ASSEMBLY AND SYSTEM FOR MONITORING DEFORMATION OF WELL EQUIPMENT

CROSS REFERENCE TO EARLIER APPLICATIONS

The present application is a Divisional application claiming benefit of application Ser. No. 14/717,401, filed on 20 May 2015, which is a Continuation of application Ser. No. 13/142,451, filed 2 Aug. 2011, which is a national stage application of International application No. PCT/EP2009/067866, filed 23 Dec. 2009, which claims priority of U.S. 61/141,738, filed in the U.S. patent office on 31 Dec. 2008. Each one of these earlier applications is incorporated herein by reference.

FIELD OF THE INVENTION

The invention relates to a carrier rod for lowering an optical fiber assembly into a well. The carrier rod may be used in a system and/or method for monitoring deformation of well equipment.

BACKGROUND OF THE INVENTION

The current approach to monitor deformation of a well casing or other well equipment is to attach or glue fiber optical or other sensing cables directly to the well casing or other well equipment. Such installation of the sensing cable is cumbersome and time consuming with a significant risk of breaking the cable during attachment or during deployment in the well.

SUMMARY OF THE INVENTION

It is an object of the present invention to provide a method for monitoring deformation of a casing or other well equipment using a optical fiber assembly which can be attached quickly to the well casing and such that the optical fiber assembly is adequately protected against breaking during attachment or during deployment in the well.

In accordance with one aspect of the invention there is provided a method of monitoring deformation, strain, temperature and/or other physical characteristics of a casing, sandscreen, electrical heater and/or other tubular or cylindrical well equipment in a well traversing an underground formation, the method comprising:
  providing a carrier rod having at least one recess extending along at least part of the length of the rod, in which recess a optical fiber assembly for monitoring strain, temperature and/or other physical parameters is arranged, which optical fiber assembly is along at least part of its length bonded within the recess;
  lowering the carrier rod and well equipment simultaneously into the well such that the carrier rod is arranged in an annular space between the outer surface of the well equipment and the inner surface of the wellbore;
  securing the carrier rod at a plurality of locations distributed along its length to the well equipment;
  connecting the optical fiber assembly to an optical signal transmission and reception assembly which is configured to transmit optical signals through the optical fiber assembly and to monitor deformation, strain, temperature and/or other physical parameters of the well equipment on the basis of any relationship between these parameters and reflection and/or modification of optical signals at different locations along the length of the optical fiber assembly.

In accordance with another aspect of the invention there is provided a carrier rod having at least one recess extending along at least part of the length of the rod, in which recess a optical fiber assembly for monitoring strain, temperature and/or other physical parameters is arranged, which optical fiber assembly is along at least part of its length bonded within the recess.

It is preferred that the carrier rod comprises a material having similar thermal expansion, and mechanical properties as the casing, sandscreen, electrical heater and/or other well equipment.

The carrier rod may be arranged on a coil and bent into a substantially straight position before it is lowered into the well and may be attached along selected intervals of its length by straps, welding, brazing and/or a bonding agent to the casing, sandscreen and/or other well equipment before it is lowered into the well.

Alternatively, the carrier rod may be secured to a tubular piece of well equipment by filling at least part of an annular space between the outer surface of the well equipment and the inner surface of the wellbore with a cement or other hardening composition and/or by expanding the tubular piece of well equipment such that at least part of an outer surface thereof is pressed against the inner surface of the wellbore.

Optionally, a plurality of carrier rods with optical fiber assemblies embedded in longitudinal recess are arranged at regular circumferential intervals around the outer surface of a tubular or cylindrical piece of well equipment.

The method according to the invention may be used to monitor deformation of tubular or cylindrical well equipment during crude hydrocarbon fluid production operations and/or during steam injection into or electrical heating of a hydrocarbon containing formation, and wherein the monitored deformation of the well equipment is taken into account to adapt, modify and/or control the hydrocarbon fluid production, steam injection and/or electrical heating operations.

These and other features, embodiments and advantages of the method and according to the invention are described in the accompanying claims, abstract and the following detailed description of preferred embodiments disclosed in the accompanying drawings in which reference numerals are used which refer to corresponding reference numerals that are shown in the drawings.

BRIEF DESCRIPTION OF THE DRAWINGS

FIG. 1 shows a longitudinal sectional view of bend well casing within a curved wellbore;

FIG. 2 shows, at a larger scale than in FIG. 1 a cross-sectional view of the bend well casing of FIG. 1 around which four rods with recesses in which strain monitoring optical fiber assemblies are arranged;

FIG. 5 shows an alternative embodiment of the rod, wherein the rod has a square cross-sectional shape;

FIG. 6 shows another alternative embodiment of the rod, wherein the rod has a cylindrical cross-sectional shape; and FIG. 7 shows yet another alternative embodiment of the rod, wherein the rod has a cylindrical cross-sectional shape.

DETAILED DESCRIPTION OF THE DEPICTED EMBODIMENTS

FIG. 1 shows a curved wellbore 1 in which a bend casing 2 is arranged. The casing 2 is secured within the wellbore 1 by cement 3, which fills the annular space between the outer surface of the casing 2 and the inner surface of the wellbore 1.

In order to monitor stress, deformation, temperature and other features a series of four rods 4A-4D are embedded in the cement 3 around the casing 2. As illustrated in FIG. 2 each rod has a recess in which an optical strain monitoring fiber 5A-5D is embedded. The rods 4A-4D are preferably made of the same metal as the casing 2.

Figure 3:
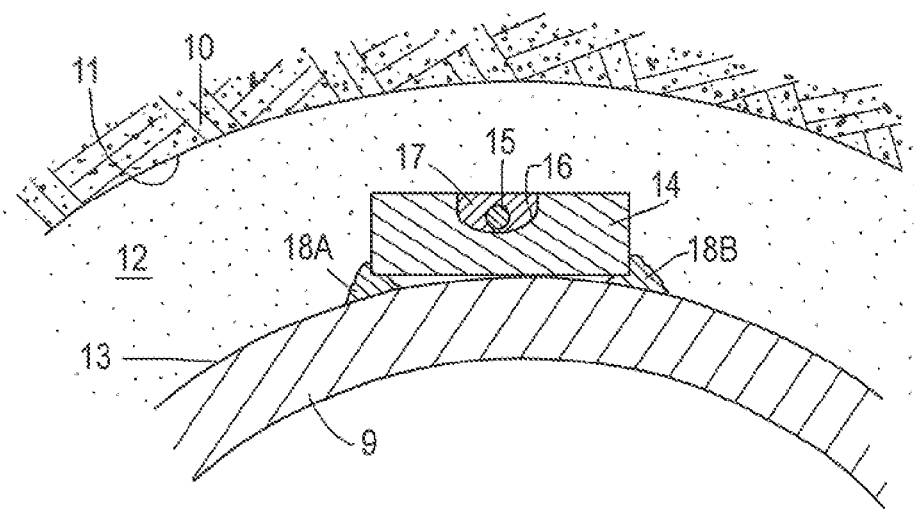
FIG. 3 shows a cross sectional view of a section of a well casing to which a rod with a recess, in which a strain monitoring assembly is arranged, is secured by spot welding.

FIG. 3 shows in more detail a cross sectional view of an alternative embodiment of a rod 14, wherein the rod has a rectangular shape and is arranged in a cement body 12 between the inner surface 11 of a wellbore in an underground earth formation 10 and the outer surface 13 of a casing 9. The rod 14 has a recess 16 in which an optical strain monitoring fiber 15 is embedded within a protective filler 17. The rod 14 is secured at selected intervals along its length to the outer surface 13 of the casing 9 by spot welds 18A-B.

Figure 4:
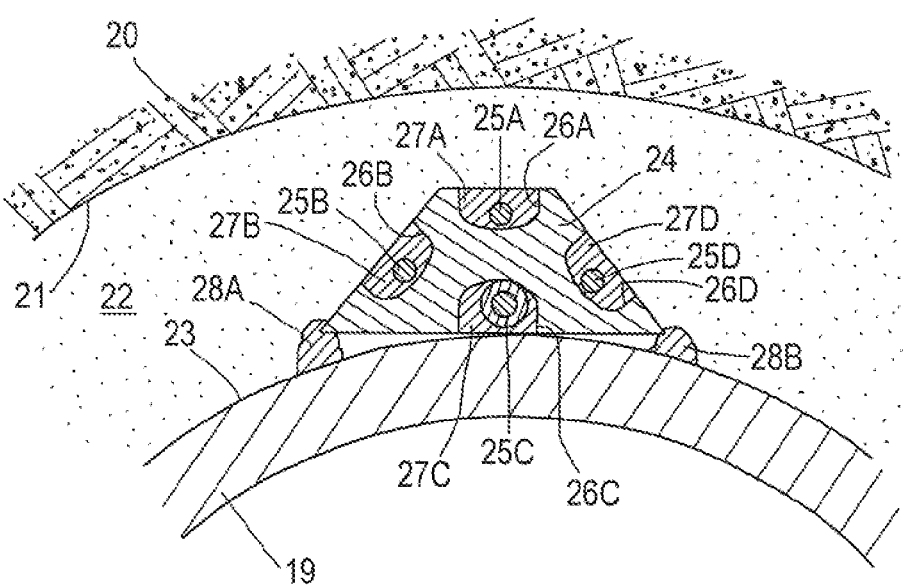
FIG. 4 shows a cross sectional view of a section of a well casing to which a rod with a plurality of recesses, in which a strain monitoring assemblies are arranged, is secured by spot welding.

FIG. 4 shows a cross sectional view of an another alternative embodiment of a rod 24, wherein the rod has a trapezoidal shape and is arranged in a cement body 22 between the inner surface 21 of a wellbore in an underground earth formation 20 and the outer surface 23 of a casing 19. The rod 24 has at each of its four sides a recess 26A-D in which an optical strain monitoring fiber 25A-D is embedded within a protective filler 27A-D. The rod 24 is secured at selected intervals along its length to the outer surface 23 of the casing 19 by spot welds 28A-B. The optical fiber 25C is configured to measure temperature.

FIG. 5 shows a cross sectional view of yet another embodiment of a rod 34, wherein the rod has a square cross-sectional shape an has at each of its four sides a recess 36A-D in which an optical strain monitoring fiber 35A-D is embedded with a protective filler 37A-D.

FIG. 6 shows a cross sectional view of yet another embodiment of a rod 44, wherein the rod has a cylindrical cross-sectional shape an has at each of its four sides a recess 46A-D in which an optical strain monitoring fiber 45A-D is embedded with a protective filler 47A-D.

The rod 44 is surrounded by two concentric layers of protective coatings 48,49.

FIG. 7 shows a cross sectional view of yet another embodiment of a rod 54, wherein the rod has a cylindrical cross-sectional shape an has at each of its four sides a recess 56A-D in which an optical strain monitoring fiber 55A-D is embedded with a protective filler 57A-D.

I claim:

1. A carrier rod for lowering an optical fiber assembly into a well, said carrier rod having at least one recess extending along at least part of the length of the rod, the recess having an outer width, in which recess an optical fiber assembly for monitoring strain, temperature or other physical parameters is arranged, which optical fiber assembly is along at least part of the optical fiber assembly's length bonded within the recess with a filler, whereby the filler surrounding the optical fiber assembly and the carrier rod is surrounded by two layers of protective coatings of which an inner layer is in contact with the filler across the full recess outer width.

2. The carrier rod of claim 1 secured at a plurality of locations distributed along the length of the carrier rod to a casing, a sandscreen, an electrical heater or other tubular or cylindrical well equipment.

3. The carrier rod of claim 2, wherein the carrier rod comprises a material having similar thermal expansion, and mechanical properties as the casing, sandscreen, electrical heater or other well equipment.

4. The carrier rod of claim 2, wherein the carrier rod is made of the same material as the casing, sandscreen or other well equipment.

5. The carrier rod of claim 2, wherein the carrier rod is secured to a tubular piece of well equipment by filling at least part of an annular space between an outer surface of the well equipment and an inner surface of a wellbore with a cement or other hardening composition.

6. The carrier rod of claim 2, wherein the carrier rod is secured to a tubular piece of well equipment by expanding the tubular piece of well equipment such that at least part of an outer surface thereof is pressed against an inner surface of a wellbore.

7. The carrier rod of claim 2, wherein the carrier rod is disposed longitudinally aligned with and parallel to the casing, sandscreen, electrical heater or other tubular or cylindrical well equipment.

8. The carrier rod of claim 1 arranged on a coil.

9. The carrier rod of claim 1, wherein the recess is longitudinal to the carrier rod.

10. The carrier rod of claim 9, wherein carrier rods of a plurality of carrier rods are arranged at regular circumferential intervals around an outer surface of a tubular or cylindrical piece of well equipment.

11. The carrier rod of claim 1 in use to monitor deformation of tubular or cylindrical well equipment during crude hydrocarbon fluid production operations.

12. The carrier rod of claim 1 in use to monitor deformation of tubular or cylindrical well equipment during steam injection into a hydrocarbon containing formation.

13. The carrier rod of claim 1 in use to monitor deformation of tubular or cylindrical well equipment during electrical heating of a hydrocarbon containing formation.

14. A system for monitoring deformation, strain, temperature or other physical characteristics of a casing, sandscreen, electrical heater or other tubular or cylindrical well equipment in a well traversing an underground formation, comprising:
    a carrier rod for lowering an optical fiber assembly into the well, said carrier rod having at least one recess extending along at least part of the length of the rod, the recess having an outer width, in which recess an optical fiber assembly for monitoring strain, temperature or other physical parameters is arranged, which optical fiber assembly is along at least part of the optical fiber assembly's length bonded within the recess with a filler, whereby the filler surrounding the optical fiber assembly and the carrier rod is surrounded by two layers of protective coatings of which an inner layer is in contact with the filler across the full recess outer width; and
    an optical signal transmission and reception assembly connected to the optical fiber assembly.

15. The system of claim 14 wherein the carrier rod is secured at a plurality of locations distributed along the length of the carrier rod to the casing, sandscreen, electrical heater or other tubular or cylindrical well equipment.

16. The system of claim 15, wherein the carrier rod comprises a material having similar thermal expansion, and mechanical properties as the casing, sandscreen, electrical heater or other well equipment.

17. The system of claim 15, wherein the carrier rod is made of the same material as the casing, sandscreen or other well equipment.

18. The system of claim 14, wherein the carrier rod is disposed longitudinally aligned with and parallel to the casing, sandscreen, electrical heater or other tubular or cylindrical well equipment.

19. The system of claim 14, wherein the recess is longitudinal to the carrier rod.

20. The system of claim 14 wherein the optical signal transmission and reception assembly is configured to transmit optical signals through the optical fiber assembly and to monitor deformation, strain, temperature or other physical parameters of the well equipment on the basis of any relationship between these parameters and reflection or modification of the optical signals at different locations along the length of the optical fiber assembly.

* * * * *